Sept. 17, 1963  E. A. THOMPSON  3,103,769
PRECISION FEED MOTION ARRESTER
Filed Nov. 30, 1960  3 Sheets-Sheet 1

INVENTOR.
EARL A. THOMPSON
BY
Ralph L. Tweedale
ATTORNEY

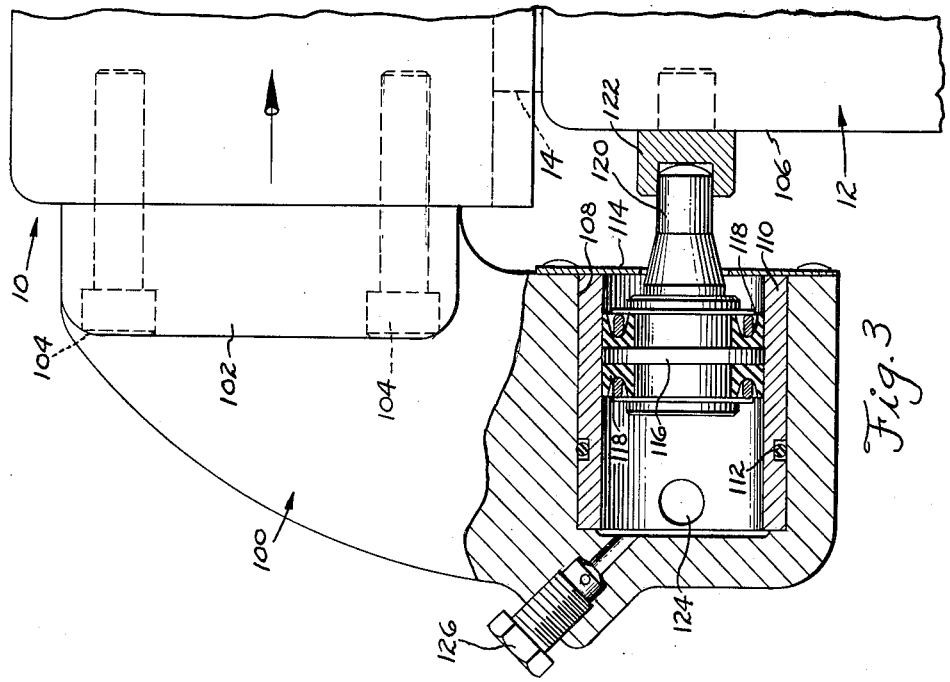
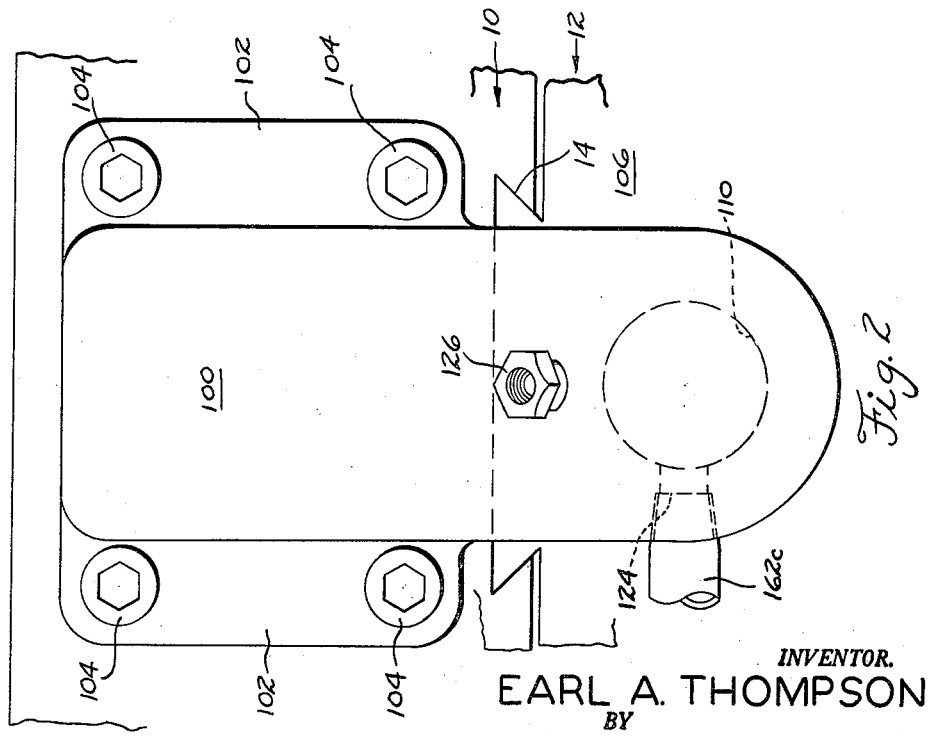

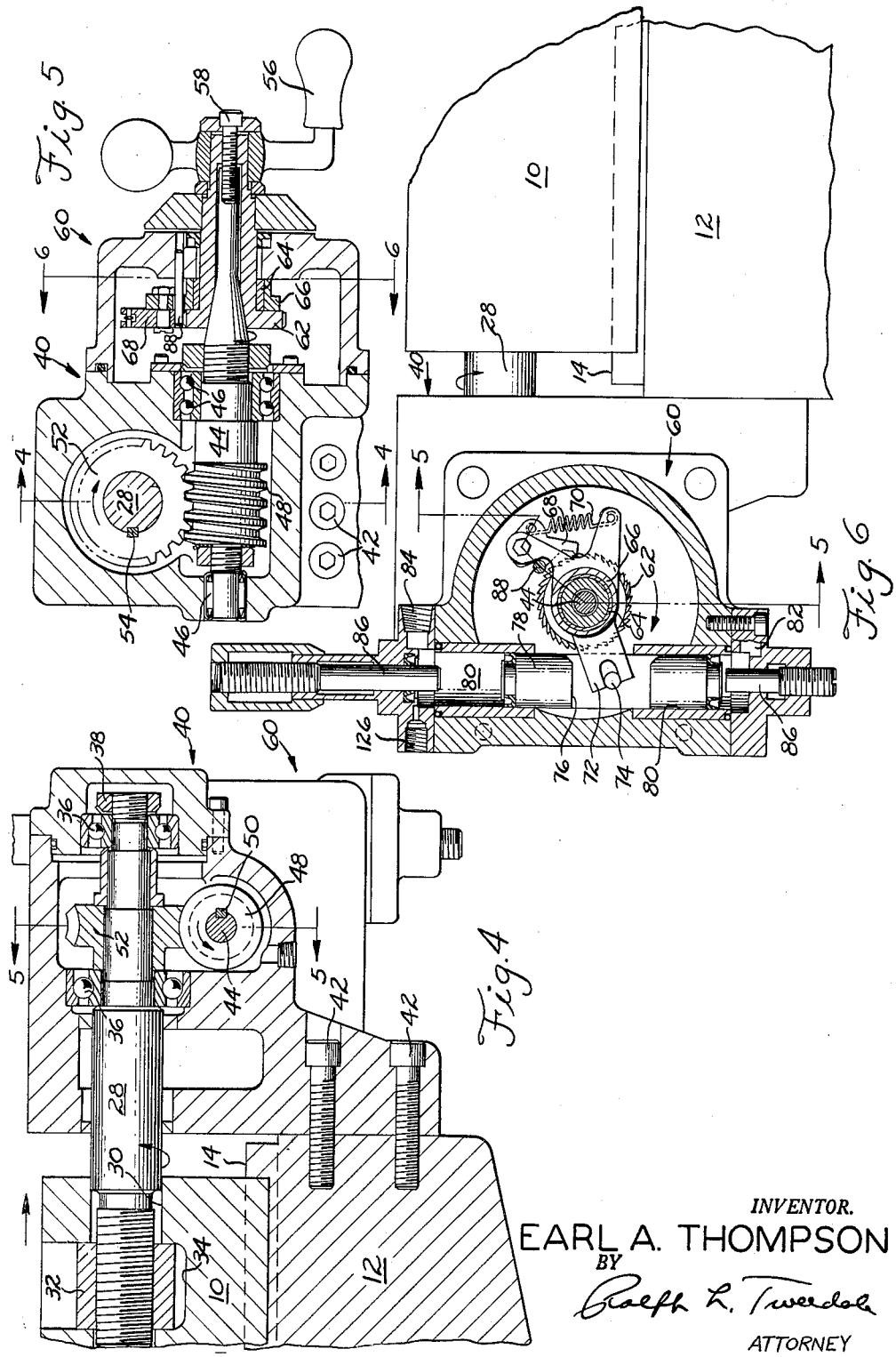

United States Patent Office

3,103,769
Patented Sept. 17, 1963

3,103,769
PRECISION FEED MOTION ARRESTER
Earl A. Thompson, 1300 Hilton Road, Ferndale, Mich.
Filed Nov. 30, 1960, Ser. No. 72,657
4 Claims. (Cl. 51—165)

This invention relates to controls for machine tools and the like, and more particularly to apparatus for achieving increased accuracy of motion of a member such as a machine tool slide. More specifically, it relates to devices for minimizing random motion between steps of intermittent feed motion whereby such a slide may be stabilized after partaking of any increments of feed motion.

On machinery in general and the higher precision mass production type machine tools in particular, serious design problems are often encountered in attempting to maintain a member, shiftable with step-by-step motion, completely stationary relative to its base or support between the shifting steps. For instance, many machines include a slide or work member which must be accurately inched along a base member in one direction with increments of feed motion separated by periods of rest. During the rest portion of the cycle, the critical machine operation is performed. But the high degree of accuracy in the advancing or feed motion is lost as far as precision machine operations are concerned if the work member creeps or slips relative to the base during the intermissions in positive forward motion. Because the feed strokes are often so short as to be measured in thousandths of an inch and because the strokes are additive in the one direction, standard locating pins or limit stops for mechanically anchoring the work member are entirely inapplicable.

Generally, a worm-turned lead screw, wedge, cam or similar self-locking force multiplication mechanical device is used to produce the intermittent increments of slide motion and also a braking or locking of the slide during the stop time. Manual cranks, hydraulic motors or like power means may be employed to operate this drive mechanism. As it is operated, however, the various parts of the machine are put under stress, from the base through the drive arrangement to the work member itself. These stresses arise from the inherent surface friction between the work member and the base, first the static friction which must be overcome and then the sliding friction existing during the shift itself. Every member has some amount of "give" or deflection, and even a small movement of a slide member or a base member actuated by a simple device such as a worm operated lead screw imposes stresses on the machine, often of a complex nature combining longitudinal and angular stresses compounded by the shape, relationship and material mechanics of the involved parts. The intensity of the resultant stress is proportional to the restraining or opposing frictional forces between mating surfaces of the slide and the base.

Moreover, when the lead screw drive is stopped, friction actually stops the slide before the inherent elasticity of the machine parts can eliminate all the stresses introduced during the shift. The remaining stresses are maintained and balanced by the friction force. Thereafter, when the slide is supposed to be completely stationary, unavoidable friction-breaking vibrations, or other conditions on the machine such as transient temperature changes, ill-timed squirts of slide lubricant, cyclical differences in loading characteristics, and others, cause momentary decreases in the restraining frictional forces, and thus permit the elasticity of the various members to reduce the stress intensity with a consequential creeping or slipping movement of the slide. Such undesirable random movement introduced by deflection of the machine during periods of diminished frictional restraint between the supposedly stationary slide members may measure half a thousandths of an inch and more on commonly employed types of apparatus—obviously a condition deterimental to high precision operations.

Accordingly, it is an object of the present invention to provide a precision motion control for arresting feed motion of a machine member.

Another object of this invention is to provide an arrangement for compensating or cancelling friction-imposed stresses in a machine so that the stresses will not affect the spaced relation of the machine members as the frictional forces undergo changes.

A further object of the invention is to provide an arrangement for replacing the stresses imposed by friction on a lead screw type drive mechanism with a comparable bias whereby a work member subject to both the stresses and the bias will remain in a balanced or stabilized state regardless of other conditions acting on the member.

A further object is to provide a work member shiftable on a base by a lead screw type drive mechanism with a fluid motor means to bias the work member in a direction opposed to the direction of lead screw drive to stabilize the member when it is not being positively shifted by the lead screw mechanism.

A further object is to provide two biasing or motivating devices connected in opposition to a machine tool slide, one of the devices including a self-locking mechanical movement, which is connected to be operated in timed sequence by a rotary cam powdered and controlled liquid column type motion transfer unit.

Further objects and advantages of the present invention will be apparent from the following detailed description, with reference to the accompanying drawings in which like reference characters refer to the same parts throughout the several views, and in which:

FIGURE 2 is an end elevational view of the stabilizer of this invention mounted between two relatively shiftable members;

FIGURE 3 is a side elevational view of the unit shown in FIGURE 2 with parts broken away to show the cylinder-piston arrangement in sectional elevation;

FIGURE 4 is a longitudinal sectional elevational view along line 4—4 of FIGURE 5 showing a typical lead screw feed arrangement interconnecting two relatively shiftable slide members;

Figure 1:
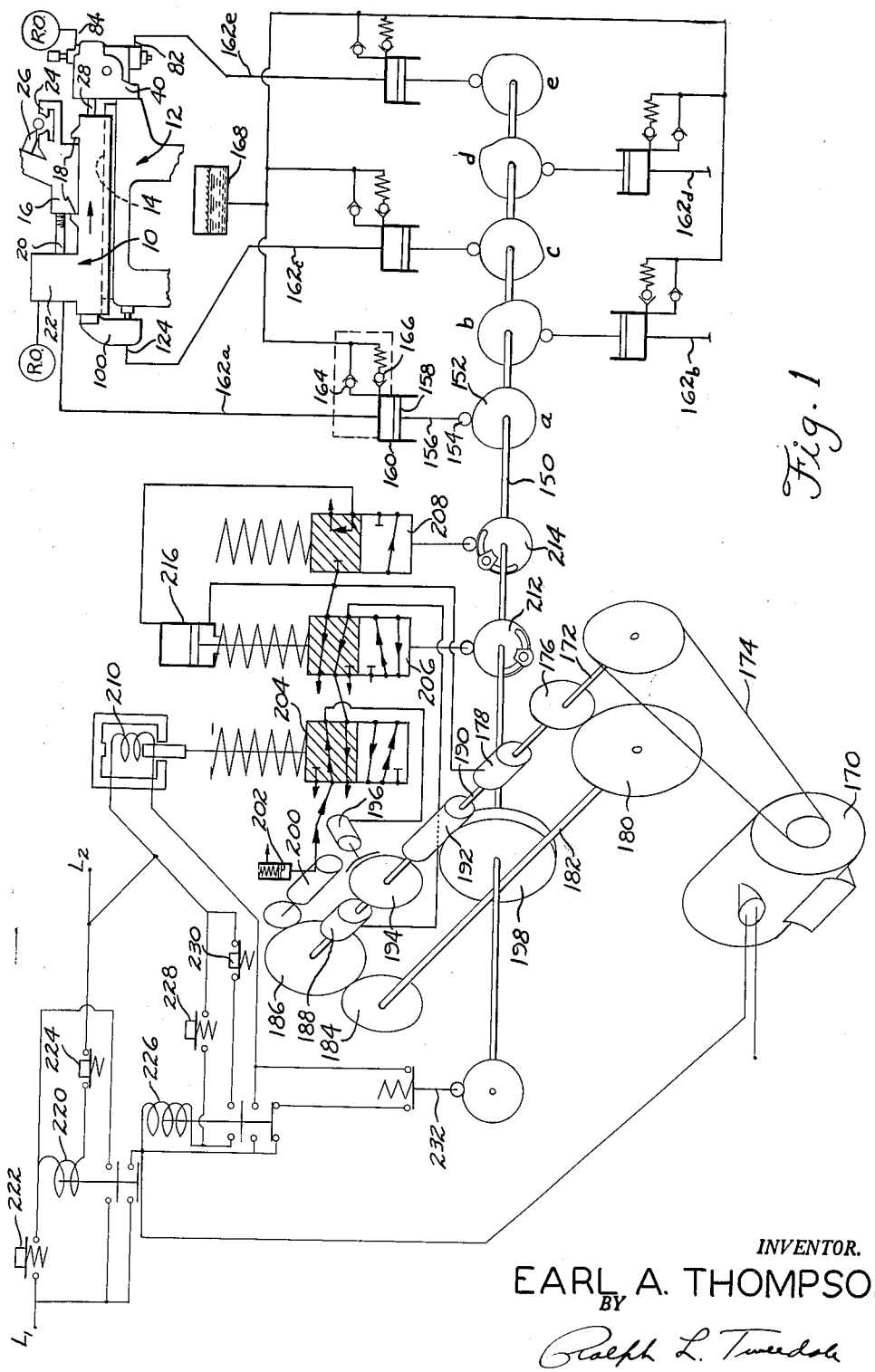
FIGURE 1 is a view in schematic fashion of the precision feed motion arrested of this invention connected to be operated by a rotary cam powered and controlled mechanico-hydraulic power and control unit.

FIGURE 5 is a composite sectional view along line 5—5 of FIGURE 4 and line 5—5 of FIGURE 6 showing the worm shaft for actuating the lead screw feed arrangement; and FIGURE 6 is a sectional view along line 6—6 of FIGURE 5 showing the fluid motor actuated ratchet mechanism for controlling the worm shaft to automatically feed one slide member in increments relative to the other slide member.

Considering the drawings in more detail, a work slide or shiftable member 10 is shown supported in conventional fashion on a base or bed 12 for to and fro motion in a given direction of translation guided by dovetail or other suitable guideways 14. The base 12 may be any convenient portion of the main framework of a high precision machine tool such, for example, as an industrial grinding machine. The slide member 10 may support an additional slide 16 for to and fro motion thereon closely limited by suitable abutment means 18. The slide 16 may be shifted by a lead screw 20 interconnecting the slide and the work member 10 and operated by suitable mechanism within a housing 22 under control of the mechanico-hydraulic motivator, to be explained in more detail below. On a machine such as an internal grinding machine, the uppermost slide 16 may support a work holder 24 and a wheel dressing apparatus 26 in fixed relationship to one another.

Means interconnecting the shiftable work member 10 and the base 12 are provided for intermittently shifting the slide along the dovetail ways through small increments of forward motion. Such a means may comprise any self-locking mechanism such as a lead screw feed arrangement interconnecting the two members 10 and 12. For instance, a rotating lead screw 28 may extend through an opening 30 in the forward end of the work slide 10 and then into threaded engagement with a traveling nut 32 fixedly received in a suitable chamber 34 in the slide 10. The other end of the lead screw 28 is fixed against axial motion by a pair of suitable thrust bearings 36, the inner races of which are jammed thereon by a lock nut 38. The bearings 36 support the lead screw for rotary motion in a housing 40 rigidly secured by bolts 42 to the stationary base or bed 12 of the machine.

To rotate the lead screw 28 for shifting the slide, a cross shaft 44 is journalled at 46 in the housing 40 for rotary motion and includes a lefthand spiral worm gear 48. The worm 48 is keyed at 50 to the shaft 44 in a position to mesh with a worm wheel 52 keyed at 54 to the lead screw 28. Obviously, rotation of the cross shaft 44 imparts limited rotary motion to the lead screw 28.

For manually operating the slide 10 along the base 12, a hand crank 56 is taper fitted to the end of the cross shaft 44 by a screw 58 or other suitable means. However, for automatically operating the lead screw, a fluid motor actuated ratchet mechanism is provided within a housing 60 secured to the side of the housing 40 for the worm drive mechanism. Secured against rotation on the cross shaft 44 within the housing 60 is a toothed rotary ratchet 62 which may also be utilized to rotate the shaft 44. Mounted concentrically of the shaft 44 on a sleeve bearing 64 for free rotation thereabout is an oscillating member 66 which pivotally supports both a pawl 68 and a spring 70 which urges the point of the pawl into working engagement with the inclined teeth of the rotary ratchet 62. Oscillating member 66 also has a bifurcated ear 72 snugly engaged by a pin 74 fastened in a cutout area 76 of a shiftable piston 78. The piston 78 shifts to and fro within a cylinder 80 having lower and upper connections 82, 84, respectively, for admitting pressurized fluid to either end thereof. Adjustable limit stops 86 at either end of the cylinder 80 closely control the stroke of the piston 78. A dowel pin 88 fixed in the housing 60 serves to lift the point of the pawl 68 out of one-way locking engagement with the rotary ratchet 62 only when the piston 78 is in its rest position at the lower (FIGURE 6) end of the cylinder 80 against the limit stop, which enables the cross shaft 44 to be rotated in either direction by the hand crank 56. Pressurized fluid admitted to the lower end of the cylinder 80 through the connection 82 will shift the piston upwardly and oscillate the member 60 clockwise (FIGURE 6) to move the pawl 68 and consequently the ratchet 62 and its associated cross shaft 44 through several degrees of angular motion. Rotation of cross shaft 44 in turn actuates lead screw 28 through a closely controlled amount of rotation to move the slide 10 in relation to the base or bed 12 of the machine. Pressurized fluid admitted to the upper end of cylinder 80 through the connection 84 shifts the piston 78 back against the lower limit stop 86 whereupon the point of the pawl 68 rides over the inclined faces of the teeth of the rotary ratchet 62, in the known manner. When the actuating piston 78 is in its lower rest position, the screw and worm connections self-lockingly hold the slide 10 in its new shifted location on the base 12.

Each time hydraulic medium is pulsed through the connection 82 to the lower end of the cylinder 80, upward shifting of the piston 78 serves to pull the slide 10 along the dovetail ways 14 on the base 12. Once the initial friction is overcome between the slide and the base members, and while the sliding friction between the members is exerting its force in a direction opposite to the direction opposite to the direction of work slide shift, stresses of various natures will be imposed on the working parts of the machine, some of which remain after shifting motion is complete. For instance, the housing 40 for the lead screw worm arrangement will undergo complex stresses. Slight deflection of its various parts, while indeed minor and well within the elastic limits of the parts, will unavoidably be imposed by the resisting frictional force between the sliding members. The housing 40 may undergo various angular stresses; the bolts 42 may experience a slight amount of stretching; the worm gear and worm wheel and their associated keyed relationship with their respective shafts may undergo angular stresses; the lead screw 28 itself may experience a minute elongation. Other such slight bendings and stretchings may be perceived by a study of the drawings. On any given machine, the net effect of such stresses may be determined through trial and error methods or in most cases by empirical formulas. Nevertheless, it will be obvious that shifting motion of the slide 10 necessarily imparts stresses to the working arrangements of the machine which thereafter cause random creeping movement between the supposedly stationary slide members whenever there is a decrease in the restraining frictional force which generated the stresses originally.

In order to counteract or replace the stresses produced during the incremental amount of slide motion, this invention contemplates means whereby such stresses may be compensated or cancelled during the intermissions in the shifting motion so as to positively stabilize the slide members 10 and 12 against such undesirable relative motion. Regarding FIGURES 2 and 3 particularly, one mechanical arrangement for such a feed motion arrester in illustrated. As can be seen, such an arrangement may comprise a rigid cast housing 100 having lateral flanges 102 at its base. Suitable bolts 104 through the flanges 102 rigidly secure the housing to the work slide member 10. The housing 100 extends downwardly beyond the bottom of the work slide 10 and adjacent to the end 106 of the base or bed 12 of the machine.

A cylinder-piston type fluid motor is arranged in the lowermost end of the rigid housing 100. A bore 108 in the housing opening toward the end 106 of the base supports a replaceable cylinder wall insert 110 having O ring seals 112 on its outer periphery to insure a leak-free fit with the bore 108, and being maintained within the bore by an apertured cover or splash plate 114. Shiftable axially to and fro in the general direction of work slide travel within the cylinder 110 is a piston 116 including two way U pack seals 118, the piston rod 120 of which extends through the aperture in the cover plate 114 and toward the end 106 of the base. An annular abutment and centering boss 122 for receiving the end of the piston rod 120 may be provided on the end of the base member. A connection 124 admits hydraulic medium to the rear portion of the cylinder 110 behind the piston 116 to bias the piston outwardly of the cylinder and against the abutment 122 on the face of the base member which urges the slide 10 to the left (FIGURE 3) in relation to the fixed base, a bias in a direction opposite to the feed direction of the slide.

Suitable bleeder screws 126 may be located at high points in both the cylinders 80 and 110 to relieve trapped air bubbles from the hydraulic system. One hydraulic system which may be employed for the purpose of giving coordinated motivation to the two fluid motors described is a rotary cam powered and controlling mechanico-hydraulic programming system for repeatedly producing a cycle of movement for both the slide motion control arrangement disclosed herein as well as the other operating mechanisms on a given machine. Such a power and control unit is illustrated schematically in FIGURE 1. This system may be constructed as a unit having its own housing which may be positioned at any convenient location on or adjacent the machine and which may be connected to the various hydraulic cylinders on the machine by suitable rigid or flexible piping.

Briefly, such a unit ordinarily may comprise a main camshaft 150 having a plurality of rotary cams 152 keyed thereon, each cam having a contour composed of predetermined rise and fall ramps to produce a desired motion and impart it to a cam follower 154 during each complete revolution or cycle of the cam. Each cam follower 154 is connected by means of a piston rod 156 with a pulsator piston 158 reciprocable within a fixed transmitter or pulsator cylinder 160 to comprise a variable volume chamber. Such a unit comprises a pulse transmitter of the expansible chamber type to which one end of a liquid column may be connected. The camshaft 10 drives a number of these pulsator sections designated $a$ through $e$, respectively. Each section may comprise units duplicating the typical single acting pulsator unit described immediately above.

Each of the motivator sections may include a balancing valve assembly which may be incorporated within the head of the cylinder 160. The balancing valve contains a replenishing check valve 164 and a spring closed pressure relief valve 166. All the replenishing and relief valves are connected together and to a common oil reservoir 168 which may be formed in the housing of the mechanico-hydraulic drive unit if desired. The reservoir 168 is preferably subjected to a low, super-atmospheric pressure by a body of compressed air or other pressure maintaining arrangement. Check valve 164 allows flow from the reservoir 168 to the cylinder 160, while relief valve 166 allows flow oppositely when the cylinder pressure exceeds a certain value. The spring load on the relief valve 166 may be made adjustable by any suitable mechanism, not shown. Thus, each of the pairs of valves 164 and 166 may be referred to as a balancing valve which serves to balance the volume of liquid in each of the liquid column sections.

The pulsator sections $a$ through $e$ are connected by closed liquid columns with the work performing cylinders. The pulsator section $a$ is connected by a closed liquid column 162$a$ with the mechanism in the housing 22 for shifting the upper slide 16 to and fro on the work slide 10 between the limit stops 18. Section $c$ of the motivator is connected by a closed liquid column 162$c$ with the connection 124 of the hydraulic biasing mechanism 100 for arresting feed motion or stabilizing the work slide 10 upon the base 12 during intermissions in shifting motion. Pulsator section $e$ is connected by a closed liquid column 162$e$ with the connection 82 at the lower end of the cylinder 80 for intermittently pulsing hydraulic medium against the piston 78 to operate the ratchet mechanism in the housing 60 to shift the slide 10 through step by step motion on the base. Pulsator sections $b$ and $d$ may be connected by closed liquid columns 162$b$ and 162$d$, respectively, with other hydraulic motors on the machine for operating them in timed sequence with the operation of the slide 10 disclosed herein. Obviously, other pulsator sections, not shown, may be provided all of which may be powered and controlled by cams operating off the master camshaft 150 to maintain the programmed arrangement for every movable member on the machine.

In order to insure proper synchronization of the driving and the driven elements of each pulsator section, it is desirable to provide slightly more fluid displacement in the driving or transmitting elements 160 than is present in their respective fluid motors at the opposite end of the liquid column line. Thus, at the end of each advancing stroke of the transmitter piston 158, a small amount of fluid will be discharged to the reservoir 168 through the relief valve 166. This amount, plus any amount lost through leakage, will be returned to the liquid column at the end of the return stroke by the operation of the replenishing valve 164.

Connected to the fluid motors opposite the liquid column connections there are shown circles marked RO which designate return oil connections by means of which a pulsator section may be hydraulically biased so as to maintain the follower in close contact with the cam as the falling portion of the cam contour recedes from the follower. This bias is maintained by a high pressure accumulator or oil reservoir, not shown, which may be provided with a manifold whereby both of the RO connections are joined together and to the high pressure reservoir. The showing of separate return oil connections is indicative of any suitable type of biasing pressure source, whether it be a single accumulator or multiplicity thereof. The contours of the individual cams 152 are likewise not illustrated in specific detail, since they may be formed in accordance with the usual practice to cause motivation of each of the fluid motors to operate the work slide in accordance with the particular operating cycle desired for the machine.

For turning the camshaft 150 a motor 170 drives an input shaft 172 of a two-speed transmission through a belt drive 174. The input shaft 172 drives a pinion 176 and also the input member of a hydraulically engaged, spring-released clutch 178. Pinion 176 drives a gear 180 secured to a countershaft 182 which carries a pinion 184 at the opposite end. Pinion 184 drives a gear 186 and therewith constitutes a set of change speed gears. Gear 186 drives the input member of a second hydraulically engaged, spring released clutch 188. The driven members of clutches 178 and 188 are secured to the opposite ends of the shaft 190 having a worm 192 thereon and a brake drum 194. The latter has a spring biased hydraulic motor 196 for engaging the brake. Worm 192 drives a worm wheel 198 secured to the main camshaft 150.

For the purpose of automatically controlling the starting, stopping and speed of the transmission, there may be provided a hydraulic control pump 200 driven from gear 186, which may circulate a body of oil contained in the housing surrounding the transmission. The pump 200 may deliver to a combined accumulator and relief valve comprising a spring loaded piston 202 and also supplies oil to a bank of control valves 204, 206 and 208. In the diagrams, each valve is shown as a two-position valve, spring biased to the position illustrated in which the connections shown in the cross hatched rectangles are established. Single headed arrows are used to indicate flow at reservoir pressure and double headed arrows are used to indicate flow at pump delivery pressure. Each of the valves, when shifted, establishes the connections shown in the unhatched rectangles immediately below the hatched rectangles.

Valve 204 is arranged to be shifted by a solenoid 210. Valves 206 and 208 are arranged to be shifted by adjustable cams 212 and 214 respectively, which are positioned on the camshaft 150. In addition, the valve 206 has a hydraulic holding cylinder 216 which holds the valve 206 in its shifted position until it is released by the shifting of the valve 208. Valve 204 in the position shown delivers pressure fluid to engage the brake 196 and also exhausts fluid to release the low speed clutch 188. When shifted, valve 204 exhausts fluid to release the brake 196 and supplies pressure fluid to engage the low speed clutch 188, subject, however, to a conjoint control by the valve 206.

The latter valve, in the position illustrated, exhausts fluid to release the high speed clutch 178 and places the low speed clutch 188 under the control of valve 204. In its shifted position valve 206, provided valve 204 has been shifted, delivers pressure fluid to engage high speed clutch 178 and exhausts fluid to release low speed clutch 188. As previously explained, the valve 208 is merely a reset valve for bypassing the holding cylinder 216 to permit valve 206 to return to its spring biased position shown in the drawings.

Thus, energization of solenoid 210 will start the camshaft 150 rotating at slow speed. Thereafter, the cam 212 will shift the transmission to drive the camshaft at high speed, and still later the cam 214 will again shift the transmission to slow speed. So long as the solenoid 210 remains energized, the camshaft 150 will continue to rotate, first at a slow speed then at a high speed during each revolution, controlling its own speed changes by operation of the cams 212 and 214.

For the purpose of controlling the drive motor 170 and solenoid 210, there is provided an electric control circuit connected between a pair of electric supply lines designated L1 and L2. The circuit may include a master relay 220 of the holding type having a manual master start switch 222 and a manual master stop switch 224. Relay 220 controls the motor 170 and also a cycle control relay 226 of the holding type having a manual cycle start switch 228, and a manual cycle stop switch 230. The normally opened contacts of relay 226, which are of the make-before-break type, control energization of cycle solenoid 210 directly. The normally closed contacts of relay 226 also control solenoid 210 but are in series with a cam switch 232 and arranged to be opened once during each revolution thereof. The arrangement is such that when the cycle stop switch 230 is operated at any point in the rotation of camshaft 150, relay 226 will be de-energized. The solenoid 210 will remain energized until cam switch 232 opens at the predetermined stopping point. Operation of the master stop switch 224, however, will de-energize solenoid 210 immediately, regardless of the point in the cycle, and will also de-energize the motor 170.

Obviously, the speed ratio between the high and low speeds of the camshaft 150, and the duration of the high speed portion of the cycle, may be selected as desired through use of the appropriate change gears 176—186 and through the adjustment of the cams 212 and 214, if desired. Of course, the two speed feature of the transmission may be omitted and the low speed clutch 188, the cams 212 and 214, and the valves 206 and 208 eliminated.

Thus, for each rotation of the camshaft 150, the slide feed motion control of this invention will be operated through a predetermined sequence of motion. At the beginning of each cycle, liquid column 162e under control of the cam 152 at the pulsator station e will transmit fluid through the lower connection 82 of the cylinder 80 and shift the ratchet piston 78 upwardly against the limit stop. This imparts several degrees of angular motion to the cross shaft 44 which, through the worm gear-worm wheel connection, transmits a precise amount of rotary motion to the lead screw 28. As this happens, stresses are imposed upon the machine which are evidenced by minute deflections of the working parts of the mechanism. Even after the slide 10 has been shifted by rotation of the lead screw 28 in the slide supported nut 32, some of these stresses are maintained by the friction between the slide members—for instance, friction along the dovetail guideways 14. After the work member 10 has been shifted, the motion arrester or stabilizer 100 of this invention may be operated. The contour on the working face of the cam 152c may shift the liquid column 162c to provide a biasing pressure against the face of the piston 116 to urge the slide 10 relative to the base in a direction opposite that in which it has just been moved by the lead screw. This may be done while the cam 152 at the motivator section e is presenting a falling face to its follower 154 to enable the high pressure from the source RO admitted to the cylinder 80 through the connection 84 to move the piston 78 back to its rest position. The amount of pressure which the liquid column 162c imparts to the slide 10 may be regulated by the pressure of the spring setting on the relief portion 166 of the balancing valve. The pressure is set so that the piston-cylinder motor in the housing 100 urges the slide 10 in a direction opposed to lead screw actuation with a force cancelling the stresses remaining in the lead screw mechanism. Through the remainder of the working portion of the cycle, the cam 152c continues to present a slightly rising face to its follower so that the relief valve 166 continually diverts extra-pressure liquid to the reservoir 168. During this portion of the cycle, which represents an intermission in the step by step feed motion of the slide 10, the various precision operations may be performed by other parts of the machine.

For instance, the mechanism in the housing 22 may rotate the lead screw 20 back and forth to shift the slide 16 between the limits 18 to move a workpiece against an internal grinding wheel, or any other such operation as may be necessary on a given machine. When the machine operations are complete, near the end of the rotation of the camshaft 150, the cam 152 at pulsator section c may present a falling face, or dip, to its follower to relieve pressure against the piston 116 while the cam 152 at pulsator section e exhibits a rise, or peak, to its follower to once again operate the piston 78 of the ratchet mechanism to draw the slide 10 through another short stroke of inching motion which may represent the amount of material that is to be dressed off an internal grinding wheel prior to the next grinding operation. Immediately upon completion of the slide motion, the stabilizer 100 will once again cancel the friction imposed stresses on the machine to maintain the slide in precisely fixed spacial relation to the base member 10 in spite of any conditions which might vary the frictional force between the slide members.

Thus, a precision feed motion arrester is provided which insures stability of a slide during intermissions in shifting motion on a machine. Such a mechanism embodies a simple piston-cylinder arrangement which may be actuated immediately upon completion of a precise amount of feed motion and held throughout the precision working portion of the machine cycle. It will be appreciated that the stabilizing arrangement of this invention may be utilized to solve a large variety of machine motivation problems, and is not limited to use on grinding machines. In any environment in which a slide must be moved through a precise amount of feed motion and then held completely stationary, the general aspects of this invention will find application.

While the above described embodiment constitutes a preferred mode of carrying out this invention, many other forms may be adopted within the scope of the actual invention, which is variously claimed as:

1. A machine comprising a base member mounting a work member for intermittent shifting through a series of successive feed steps, drive means connected at one point with one member and at another point with the other member for both shifting the work member through the series of feed steps as well as holding it in a series of working positions in the intermissions between the feed steps, power means connected to intermittently actuate the drive means to commutatively change the distance between the two points, each time overcoming restraining friction between the members and shifting the work member through a feed step, and arresting means operative during the intermissions for counter-acting residual stresses generated in the machine by friction during each feed step whereby changes in restraining friction between the members and action of diverse forces on the members during shift intermissions will not cause creeping of the work member from the desired working positions.

2. A machine comprising a base member mounting a work member for intermittent shifting through a series of successive feed steps, drive means connected at one point with one member and at another point with the other member for both shifting the work member through the series of feed steps as well as holding it in a series of working positions in the intermissions between the feed steps, power means connected to intermittently actuate the drive means to cumulatively change the distance between the two points, each time overcoming restraining friction between the members and shifting the work member through a feed step, and arresting means operative during the intermissions for counter-acting residual stresses generated in the machine by friction during each feed step, the arresting means including shiftable piston type fluid motor means connected to act between the two members, and means for supplying pressure fluid to the motor means only during shift intermissions whereby changes in restraining friction between the members and action of diverse forces on the members during shift intermissions will not cause creeping of the work member from the desired working positions.

3. A machine comprising a base member mounting a work member for intermittent shifting through a series of successive feed steps, mechanical drive means of the self-locking force multiplication type connected at one point with one member and at another point with the other member for both shifting the work member through the series of feed steps as well as holding it in a series of working positions in the intermissions between the feed steps, shiftable piston type fluid motor means connected to intermittently actuate the drive means to cumulatively change the distance between the two points, each time overcoming restraining friction between the members and shifting the work member through a feed step, and arresting means operative during the intermissions for counter-acting residual stresses generated in the machine by friction during each feed step whereby changes in restraining friction between the members and action of diverse forces on the members during shift intermissions will not cause creeping of the work member from the desired working positions.

4. A machine comprising a base member mounting a work member for intermittent shifting through a series of successive feed steps, mechanical drive means of the self-locking force multiplication type connected at one point with one member and at another point with the other member for both shifting the work member through the series of feed steps as well as holding it in a series of working positions in the intermissions between the feed steps, shiftable piston type fluid motor means connected to intermittently actuate the drive means to cumulatively change the distance between the two points, each time overcoming restraining friction between the members and shifting the work member through a feed step, and arresting means operative during the intermissions for counter-acting residual stresses generated in the machine by friction during each feed step, the arresting means including shiftable piston type fluid motor means connected between the members to act in opposition to the drive means, and a mechanico-hydraulic motivator of the rotary cam and liquid column type connected to actuate the fluid motor means through a program of coordinated motion whereby changes in restraining friction between the members and action of diverse forces on the members during shift intermissions will not cause creeping of the work member from the desired working positions.

References Cited in the file of this patent
UNITED STATES PATENTS

| | | |
|---|---|---|
| 1,723,852 | Haas | Aug. 6, 1929 |
| 2,049,611 | Harrison et al. | Aug. 4, 1936 |
| 2,392,169 | Mansfield | Jan. 1, 1946 |
| 2,843,975 | Kamm | July 22, 1958 |
| 2,911,766 | Jones | Nov. 10, 1959 |